United States Patent
Bremont

[11] Patent Number: 6,083,558
[45] Date of Patent: Jul. 4, 2000

[54] METHOD FOR COATING ADHESIVE SURFACES OF FASTENING ELEMENTS WITH HOT-MELT ADHESIVES

[75] Inventor: Michel Bremont, Saint-Louis, France

[73] Assignee: A. Raymond & Cie, France

[21] Appl. No.: 09/297,466

[22] PCT Filed: Oct. 7, 1997

[86] PCT No.: PCT/EP97/05501

§ 371 Date: Apr. 28, 1999

§ 102(e) Date: Apr. 28, 1999

[87] PCT Pub. No.: WO98/18612

PCT Pub. Date: May 7, 1998

[30] Foreign Application Priority Data

Oct. 30, 1996 [DE] Germany ............ 196 45 000

[51] Int. Cl.[7] ........................................... B05D 1/12
[52] U.S. Cl. ............... 427/195; 427/208.2; 427/277; 427/287; 427/370
[58] Field of Search ............... 427/207.1, 208.2, 427/271, 277, 287, 385.5, 195, 370; 118/500

[56] References Cited

U.S. PATENT DOCUMENTS

| | | |
|---|---|---|
| 4,223,632 | 9/1980 | Cadwallader . |
| 4,262,038 | 4/1981 | Wallace . |
| 4,508,759 | 4/1985 | Wallace . |
| 5,262,197 | 11/1993 | Pollizzi . |

FOREIGN PATENT DOCUMENTS

| | | |
|---|---|---|
| 0 750 654 | 9/1995 | European Pat. Off. . |
| 1 215 305 | 12/1970 | United Kingdom . |

*Primary Examiner*—Fred J. Parker
*Attorney, Agent, or Firm*—Gifford, Krass, Groh, Sprinkle, Anderson & Citkowski, P.C.

[57] ABSTRACT

A process for coating a fastening member with a hot melt adhesive. The process includes applying adhesive in a solid form such as powder, pellet or a compressed plate of adhesive onto the surface of the fastening member, pressing the adhesive against the adhesive bearing surface of the fastening member, and then heating the adhesive, while it is subjected to pressure, to a temperature high enough to melt the adhesive. In the preferred embodiment heating is accomplished by induction. The fastening members may be preheated to a temperature in the range of 50°–90° to increase the speed of the process.

5 Claims, 2 Drawing Sheets

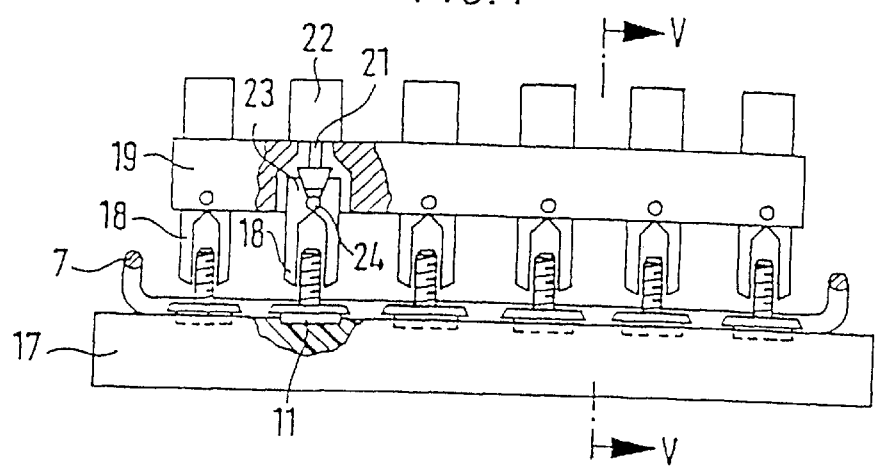
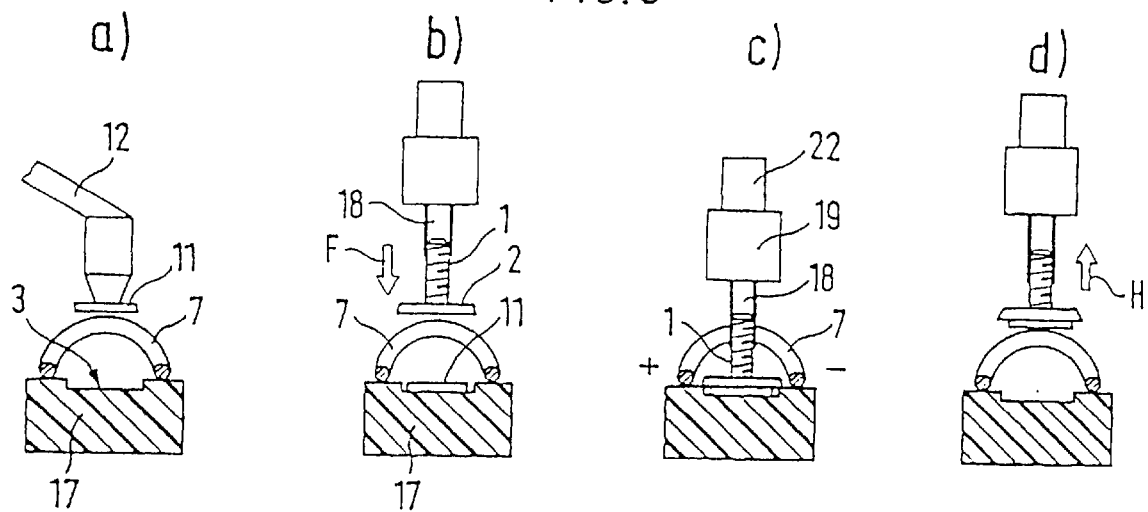
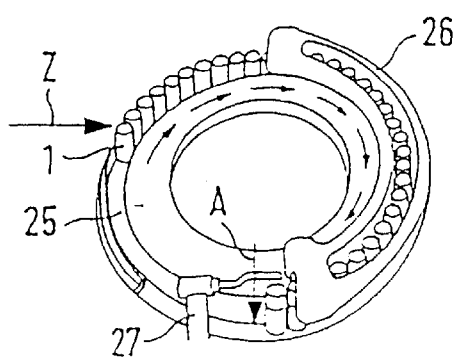
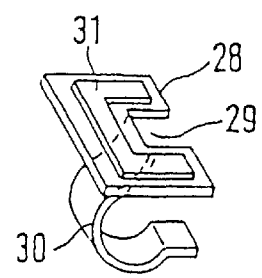

6,083,558

METHOD FOR COATING ADHESIVE SURFACES OF FASTENING ELEMENTS WITH HOT-MELT ADHESIVES

BACKGROUND OF THE INVENTION

This invention relates to a process for coating the adhesive surfaces of structural or support elements and, in particular, of fastening elements.

This invention focuses specifically on the application of highly reactive hot melt adhesives which, on exposure to temperatures up to 50° C., are wear-resistant and nonsticking and which can be reactivated on exposure to heat or some other kind of energy so as to produce a permanent adhesive joint. The adhesive coating applied to the surface must be totally nonsticky and adhesion-resistant until the fastening element is used, and the adhesive force inherent in the adhesive should be triggered only after the adhesive has been reactivated at the site of application.

It is known from German Patent No. DE 44 02 550 A1 that hot melt adhesive can be applied to the adhesive surface of a plate by lowering the fastening element with the adhesive surface face down into a hot melt adhesive bath and by lifting it again as soon as the entire adhesive surface has been wetted with a sufficient quantity of adhesive. The adhesive layer adhering to the lower surface has to be dried before the fastening elements can be packaged and transported to the application site to prevent the fastening element from sticking together.

This procedure, however, is relatively cumbersome and time-consuming since the fastening elements must be separately grasped, after which they are immersed into the hot melt adhesive bath with the adhesive surface facing down, which is followed by a drying step.

SUMMARY OF THE INVENTION

This invention is directed to simplifying the application of hot melt adhesive to the adhesive surfaces so as to not only lower the coating costs but also to increase the production.

This is accomplished by a process as follows: ready-mixed adhesive in solid form is applied to the adhesive bearing surface of the fastener and is heated while exerting a mild contact pressure. In one embodiment of the invention, the powdered adhesive is compressed to form a thin plate corresponding to the shape of the adhesive surface prior to applying it to the adhesive bearing surface.

The heat required to heat the structural or support elements and, in particular, the fastening elements can be generated using, for example, ultrasound, infrared lamps or other high-energy radiation, heating elements, hot air, or induction, with the induction method being preferred.

This method makes it possible not only to coat the adhesive surface more rapidly and cost-effectively with a hot melt adhesive but also offers another advantage in that the hot melt adhesive is subjected to the lowest possible thermal stress since only the boundary surface of the adhesive plate which is in contact with the metal surface is melted by an electromagnetic heater. This method makes it possible for the reactivation capacity of the adhesive to be substantially maintained until used on location.

By preheating the fastening elements in the range of 50° C. to 90° and subsequently to a temperature high enough to ensure the boundary surface is melted, the coating time is further shortened since the time required to melt the boundary surface of the adhesive plates can be shortened. This goal can be furthered by preheating the fastening elements to a temperature which will be sufficient to melt the adhesive when it is applied. The cooling time is even further shortened, and the coated fastening elements can be ready for use more rapidly for the intended purpose.

BRIEF DESCRIPTION OF THE DRAWING

The drawing shows a diagrammatic representation of several embodiments of implementing the coating process according to this invention which are explained in greater detail below. As can be seen, FIG. 1a) shows adhesive as it is applied in the form of a powder to the circular adhesive surface of a locking bolt, FIG. 1b) shows adhesive as it is applied in the form of pellets to the circular adhesive surface of a locking bolt, and FIG. 1c) shows adhesive as it is applied in the form of compressed plates to the circular adhesive surface of a locking bolt, FIG. 4 is a side view of an alternate embodiment of an induction device for melting the adhesive surfaces of threaded bolts onto the adhesive plates, FIG. 5 is a cross-sectional view of the processing step taken along line V—V in FIG. 4 of the alternate embodiment, FIG. 6 is a perspective view of an induction device for continuously preheating the locking bolts prior to applying the adhesive, and FIG. 7 is a perspective view of a fastening element with a noncircular adhesive surface and an adhesive plate of corresponding shape.

DETAILED DESCRIPTION OF THE PREFERRED EMBODIMENT

Figure 1:
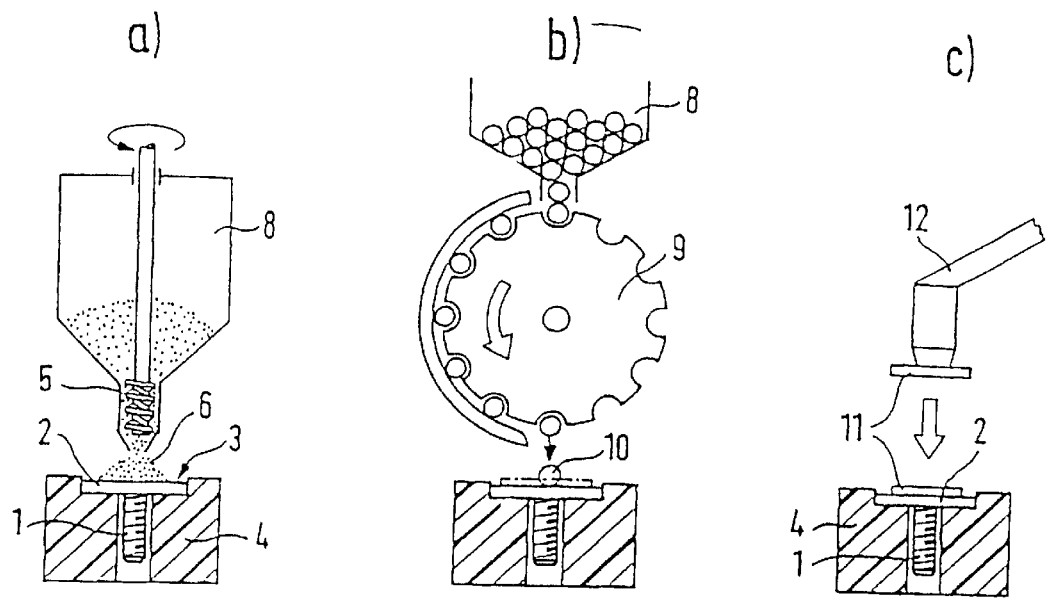

FIG. 1 shows three different manners of applying a hot melt adhesive in solid form onto the adhesive surface of a locking bolt 1. The bolt in this particular case has a circular collar plate 2 so as to enlarge the surface which will bear the adhesive or adhesive bearing surface.

Figure 2:
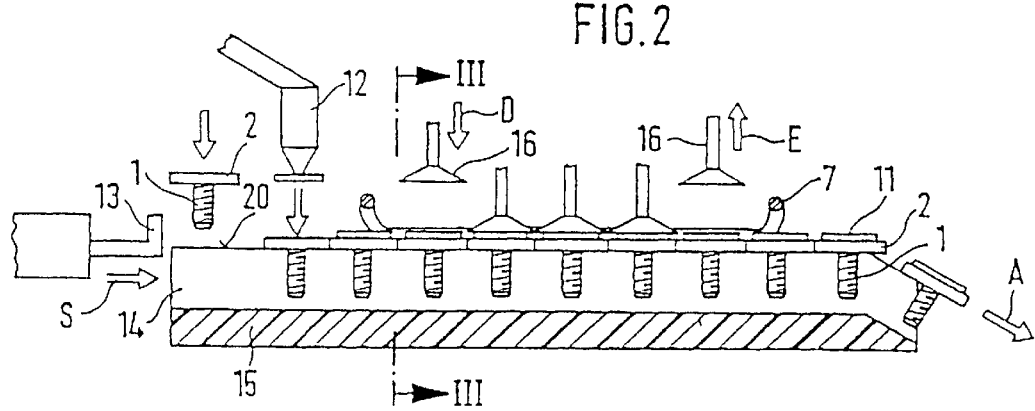
FIG. 2 is a longitudinal sectional view of an induction device for melting the adhesive plates onto the adhesive surfaces of the threaded bolts.

In FIG. 1a), ready-mixed adhesive in the form of a powder is placed on the collar plate 2 of bolt 1 which is held in a corresponding well 3 of a support bar 4. For this purpose, it is recommended that a conventional screw-type metering device 5 be used to ensure that an accurately dosed cone of adhesive powder 6 is placed on each collar plate 2. As shown in FIG. 2, the cone is next exposed to a high-frequency electromagnetic field in an inductor 7. In the course of this process, the compressed adhesive powder is melted in the immediate vicinity of the metal surface to which it adheres without subjecting the remaining adhesive to excessive thermal stress.

As shown in FIG. 1b), ready-mixed adhesive in the form of pellets 10 is fed from a collecting tank 8 via a pellet isolating device 9 onto the collar plate 2. In this case, the individual pellets 10 are preferably shaped to ensure that after melting and pressing, one pellet nearly completely covers collar plate 2.

In the embodiment illustrated in FIG. 1c), adhesive in the form of a powder is compressed in a separate process (not shown) to form plates 11, having a shape of which corresponds to the shape of the adhesive surface of collar plate 2.

These plates 11 are lowered from a conventional feeding device (not shown) by means of a conventional suction arm 12 to the collar plate 2 and are subsequently melted by means of the previously mentioned inductor 7 onto collar plate 2.

Figure 3:
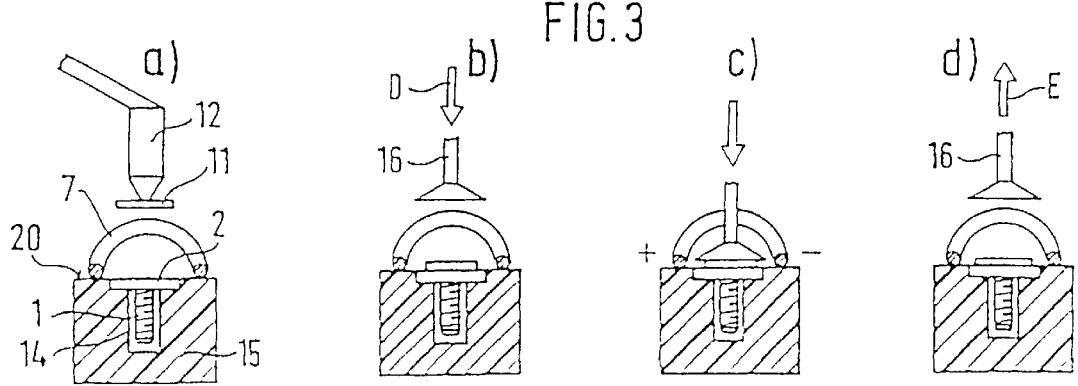
FIG. 3 is a cross-sectional view taken along line III—III of FIG. 2 of the processing steps.

This can be accomplished, for example, by means of an induction device which is diagrammatically represented in FIGS. 2 and 3. FIGS. 3a) through 3d) show the individual processing steps. In the induction device, inductor 7 is supported by a bar 15 formed to permit the fasteners to slide. The bar has a groove 14. The threaded shaft 1 of the locking bolt is lowered into the groove 14 and placed with the collar plate 2 in the recesses 20 of bar 15 which are located along both sides of groove 14. The adhesive plate 11 is gently placed onto collar plate 2 using suction arm 12 (FIG. 3a), and locking bolt 1 is pushed by means of arm 13 to slide in the direction of arrow S into the induction zone.

When all available positions within the inductor 7 are filled, stamps 16 which are made of a nonadhesive material, such as TEFLON®, are lowered into the direction of arrow D to push against the plates 11. Current is applied to inductor 7. The high-frequency magnetic field of the inductor melts the boundary surface of plates 11 to subsequently join the plates 11 to the collar plates 2 (FIG. 3c).

Next, the stamps 16 are lifted in the direction of arrow E (FIG. 3d), the locking bolts 1 at the end of bar 15 which are already coated with an adhesive plate 11 are pushed into the direction of arrow A by new locking bolts and then removed. After passing through a cooling line (not shown), the adhesive is completely set. Subsequently, the locking bolts can be placed into a container without the risk of sticking to one another and they can be transported to the site of application.

It is obvious that instead of slide 13, any other suitable means, such as the gripper tongs shown in FIGS. 4 and 5, can be used to place the threaded bolts in groups into the induction zone 7 and to lift them after they have been coated with adhesive plates 11.

Shown in FIGS. 4 and 5 is a different induction device for coating the adhesive surfaces with adhesive plates according to this invention. FIGS. 5a) through 5d) show the individual processing steps.

In this device, the finished adhesive plates 11 are introduced in groups from a collecting device (not shown), e.g., via suction tube 12 or any other suitable feeding devices, into the recesses 3 of a support bar 17, and the recesses 3, similar to groove 14 in bar 15, are surrounded by inductor 7 (FIG. 5a).

Subsequently, the locking bolts 1 which are introduced by a pellet-isolating device (not shown) and are grasped by gripper arms 18, which are able to pivot and are seated by means of king pins in a vertically sliding retaining bar 19, and subsequently lowered into the direction of arrow F onto adhesive plates 11 (FIG. 5b). The gripper arms 18 are compressed against spring tension by means of a plunger 21 which slides between the rear ends 23 of gripper arms 18. The plungers 21 are conventionally activated by means of short-stroke cylinders 22.

Subsequently, the magnetic field is switched on while at the same time pressure is briefly exerted on locking bolts 1 until the collar plates 2 have reached a temperature sufficient to melt the boundary surface of the adhesive plate 11 (FIG. 5c). As a result of the contact pressure of gripper arms 18, the adhesive surfaces of collar plates 2 are joined to the melted adhesive plates 11. Subsequently, the locking bolts 1 are lifted by the gripper arms 18 in the direction of arrow H (FIG. 5d) and moved on an appropriate cooling line. Next, as already described earlier, the bolts are collected in a collecting container and can subsequently be transported to the site of application.

In contrast to the device shown in FIGS. 2 and 3, the collar plates 2 of locking bolts 1 are placed directly onto adhesive plates 11 onto which they are pressed with a mild contact pressure.

FIG. 6 shows a device, which works on the basis of the induction principle, for continuously preheating the locking bolts prior to applying the adhesive. The locking bolts 1 which are shown as small cylinders in FIG. 6 and are moved into the direction of arrow Z. The bolts are placed onto a ring-shaped retaining groove 25 and subsequently pass through a so-called tunnel inductor 26. After leaving inductor 26, bolts 1 are pulled laterally out of groove 25 and moved in the direction of arrow A by means of ejecting device 27. The bolts are subsequently fed at a preheating temperature in a range from 50° C. to 90° C. to the previously described induction device. By preheating locking bolts 1, it is possible to heat bolts 1 in the induction device more rapidly to the melting temperature required.

It is also possible to heat the locking bolts 1 in this device to a temperature so that adhesive plates 11 can be directly applied and melted onto the adhesive surface of locking bolts 1.

FIG. 7 shows a retaining element with a rectangular adhesive surface 28 which has a recess 29 in the area of clamp strap 30. Again, the adhesive can be melted onto the surface of a correspondingly shaped adhesive plate 31 as described earlier.

What is claimed is:

1. A process for coating a fastening member with a hot melt adhesive, the fastening member having a plate having a generally planar top surface for receiving the adhesive and a bottom surface, said top surface having a predetermined shape, the fastening member further having a shank portion extending orthogonally from the bottom surface of the plate, said process comprising the steps of:

providing a support bar with a horizontally extending recess and a vertically extending groove;

placing the bottom surface of the plate of the fastening member on the recess with the shank portion extending into the groove of the bar;

applying adhesive in solid form to the top planar surface of the plate of the fastening member;

moving a plunger vertically downwardly to press the adhesive against the top planar surface of the plate with pressure; and heating the adhesive while being pressed to a temperature high enough to melt the adhesive.

2. The process of claim 1 wherein the applying step comprises applying pellets of adhesive material to the adhesive bearing surface.

3. The process of claim 1 wherein said heating step comprises induction heating with a magnetic field.

4. The process of claim 1 comprising before said application step, the steps of:

preheating said fastening member to a temperature in the range of 50° C. to 90° C.; and raising the temperature of the fastening member to a temperature sufficiently high enough to melt the boundary surface of the adhesive.

5. The process of claim 1 further comprising after the step of heating, the step of cooling the fastening member.

* * * * *

UNITED STATES PATENT AND TRADEMARK OFFICE
CERTIFICATE OF CORRECTION

PATENT NO. : 6,083,558
DATED : July 4, 2000
INVENTOR(S) : Michel Bremont

It is certified that error appears in the above-identified patent and that said Letters Patent are hereby corrected as shown below:

Column 1, line 59 - After "electromagnetic" insert --introduction--

Column 2, line 53 - Replace "electromagnetic" with --magnetic--

Signed and Sealed this

Tenth Day of April, 2001

NICHOLAS P. GODICI

*Attest:*

*Attesting Officer*  *Acting Director of the United States Patent and Trademark Office*